UNITED STATES PATENT OFFICE.

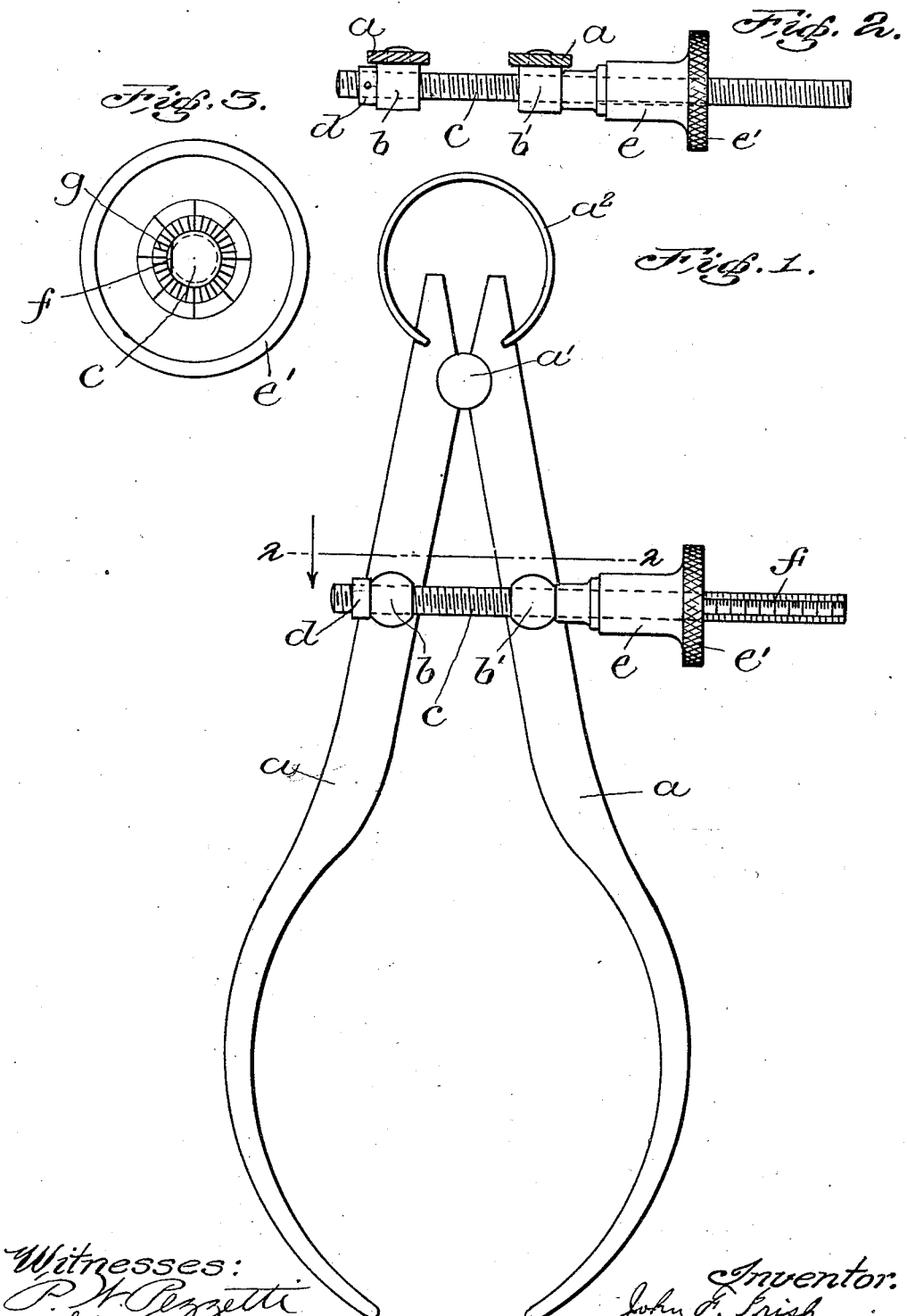

JOHN F. IRISH, OF MILTON, MASSACHUSETTS.

CALIPERS.

No. 921,407.  Specification of Letters Patent.  Patented May 11, 1909.

Application filed March 25, 1908. Serial No. 423,224.

*To all whom it may concern:*

Be it known that I, JOHN F. IRISH, of Milton, in the county of Norfolk and State of Massachusetts, have invented certain new and useful Improvements in Calipers, of which the following is a specification.

This invention relates to calipers and similar instruments particularly of the type which comprises two legs pivotally connected at one end and having a spring tending normally to opening the measuring ends of the legs.

The object of the invention is to provide a simple and reliable structure of scale members carried by or connected with the adjusting means of the legs of the instrument whereby, when the legs are adjusted, the distance or space between their free ends will be automatically indicated by said scale members.

To these ends, my invention consists in the construction and combination of parts substantially as hereinafter described and claimed.

Of the accompanying drawings in which similar reference characters indicate the same or similar parts in all of the views,—Figure 1 represents calipers, in elevation, illustrating a preferred embodiment of my invention. Fig. 2 represents a section on line 2—2 of Fig. 1. Fig. 3 represents a view from the right of Fig. 1, of the outer face of the adjusting nut and the end of the screw which passes through it.

The caliper legs $a$, which are shown as of a well known form, are pivotally connected at $a'$ and are normally pressed apart by a spring $a^2$. Mounted on the legs are the usual swiveled posts $b$ $b'$ through which the screw $c$ passes. The post $b'$ is not internally threaded, but the post $b$ is preferably internally threaded to fit the screw $c$, and the jam-nut $d$ is employed to secure or confine the screw $c$ and prevent it from having any longitudinal or rotative movement in the post $b$. As stated, however, the screw passes freely through the other post $b'$. Fitted to the screw $c$ and so as to bear against one side of the post $b'$, is an adjusting nut $e$ having a peripheral portion $e'$ which may be milled. The screw $c$ is flattened on one side and provided with a graduated scale $f$, the graduations of which coöperate with the face of the nut $e$ in order to indicate the distance between the ends of the caliper legs at any adjustment. Preferably the face of the nut $e$ is also formed with a scale as indicated at $g$ in Fig. 3, which scale will coöperate with one edge of the flattened periphery of the screw to indicate, by the rotation of the nut $e$, fractional measurements of less degree than what is provided for by the scale $f$. This practically constitutes a micrometer gage. The cuts or the graduations of the scale or scales are such, relatively to the locations of the posts $b$ $b'$ between the ends of the caliper legs and the pivotal point $a'$, as to accurately indicate by means of such scale or scales the exact distance between the ends of the caliper legs at any adjustment.

While the invention is illustrated as applied to an instrument technically known as calipers, it is to be understood that I do not limit myself thereto but may apply the same to similar instruments such as dividers.

I claim:—

1. An instrument of the character described having its legs connected by a straight screw bearing a scale, means whereby said screw is pivotally connected to each leg, and an adjusting nut on said screw and having a portion coöperating with the scale to indicate the distance between the ends of the caliper legs.

2. An instrument of the character described having its legs provided with swiveled posts, a screw fixedly mounted in one of said posts and passing freely through the other post and having a scale, and an adjusting nut mounted on said screw and abutting against one side of the post through which the screw passes freely, a portion of said nut coöperating with the scale on the screw, to indicate the spread of the ends of said legs.

3. The combination with the legs of an instrument of the character described, of a screw fixedly mounted in one post and passing freely through the other, said screw having a scale the graduations of which are arranged to indicate the distance between the ends of the caliper legs at any adjustment, and an adjusting nut mounted on said screw and having its face coöperating with the scale of the screw.

4. The combination with the legs of an instrument of the character described, of a screw fixedly mounted in one post and passing freely through the other, said screw having a scale the graduations of which are arranged to indicate the distance between the ends of the caliper legs at any adjustment, and an adjusting nut mounted on said screw and having its face coöperating with the scale of the screw, the outer face of said nut having a circularly graduated scale.

In testimony whereof I, have affixed my signature, in presence of two witnesses.

JOHN F. IRISH.

Witnesses:
A. W. HARRISON,
P. W. PEZZETTI.